June 16, 1953   J. B. BLACK ET AL   2,642,168
POWER TRANSMISSION
Filed July 20, 1950   4 Sheets-Sheet 3
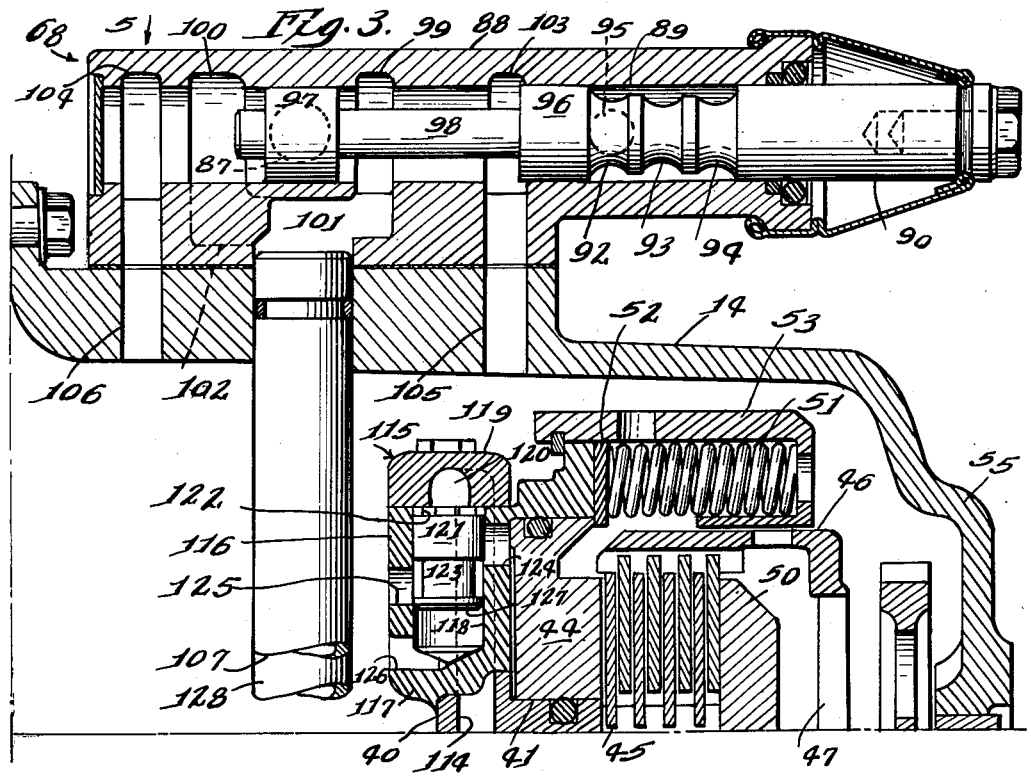
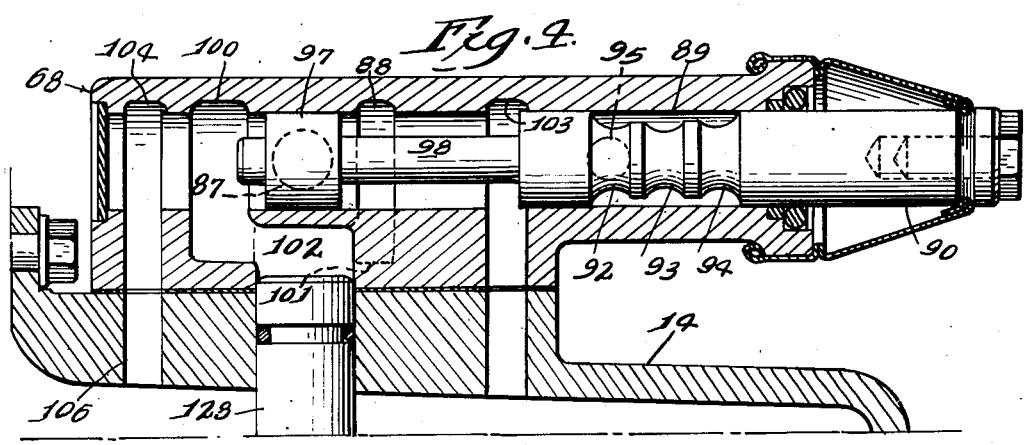
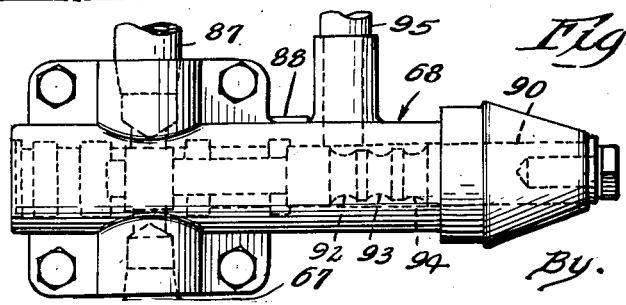
Inventors.
James B. Black.
Wilbur F. Shurts.
By.

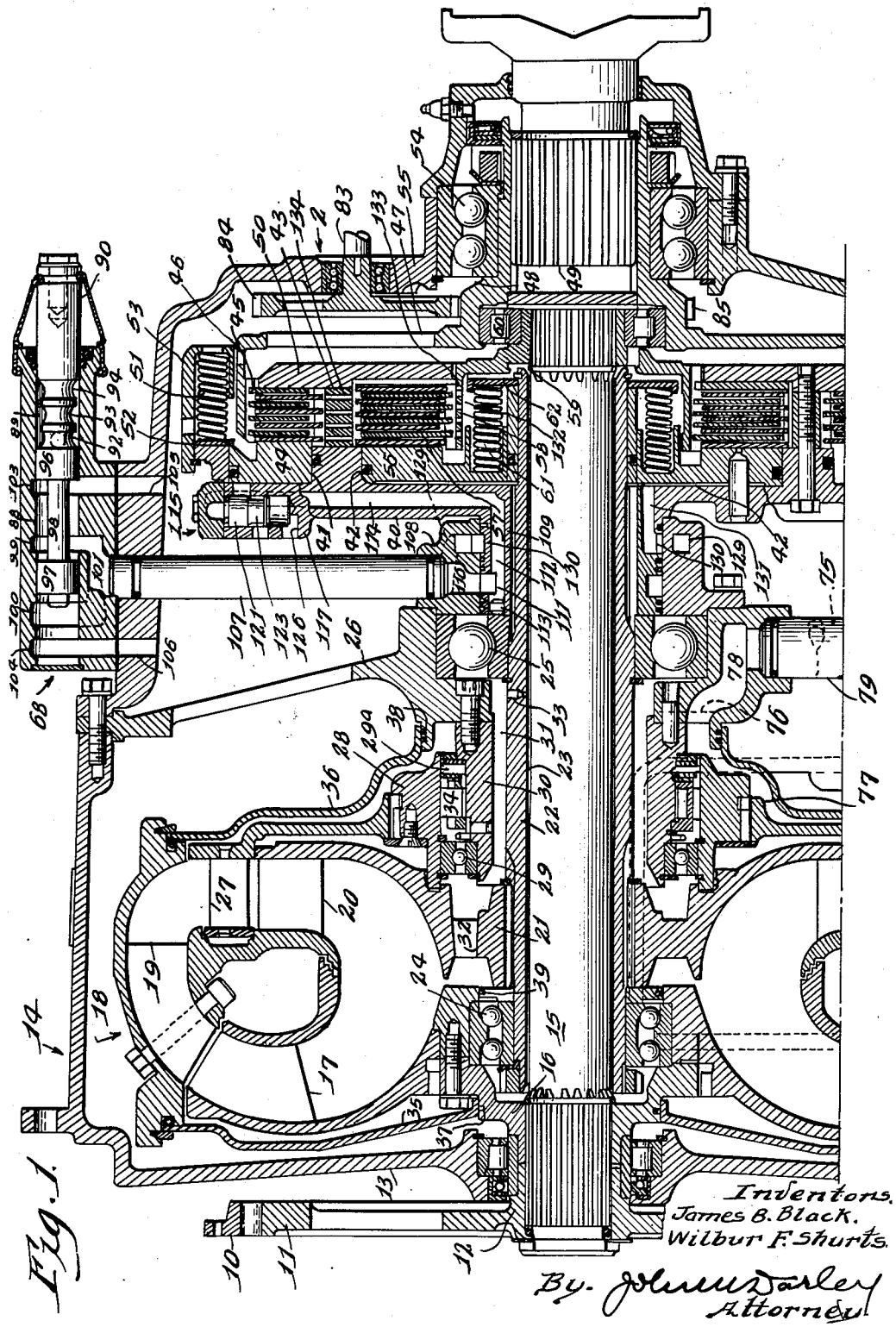

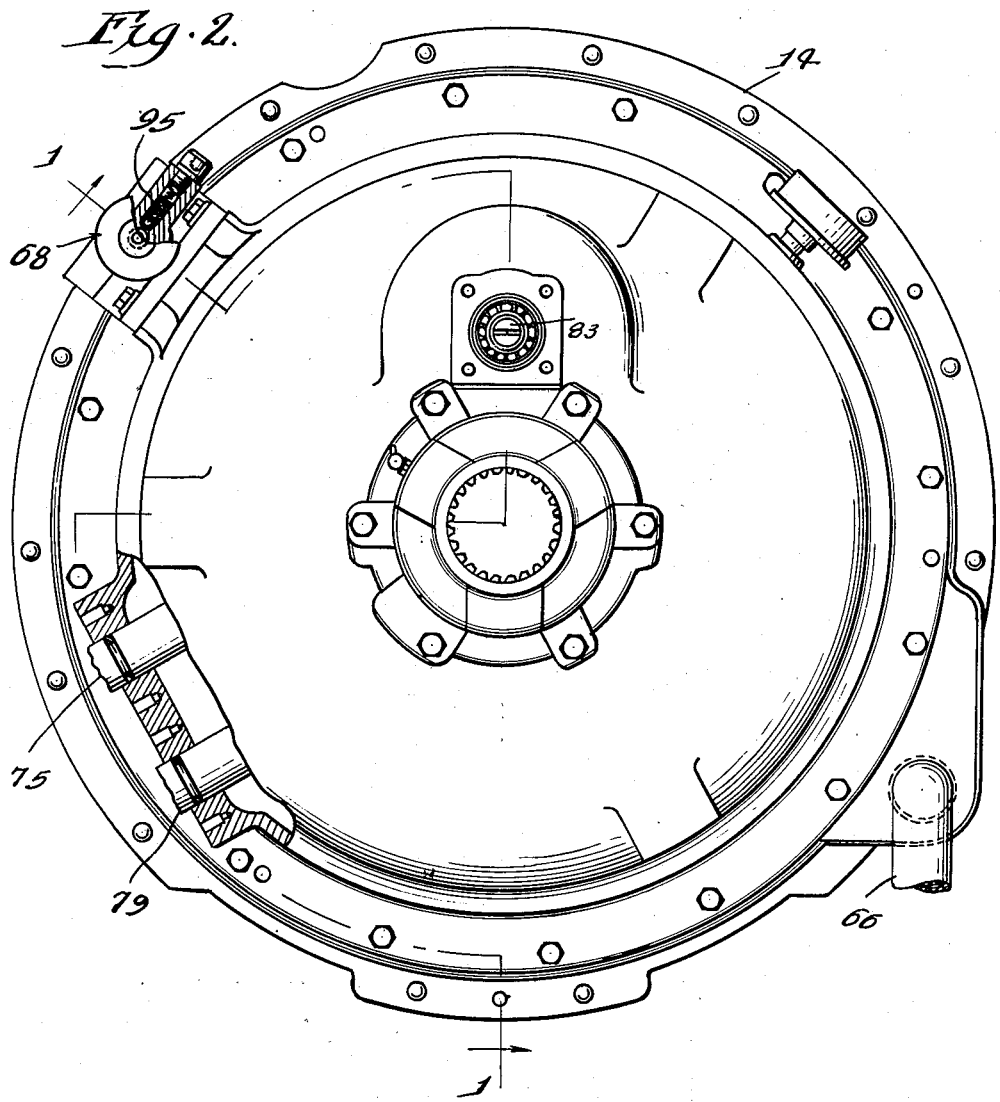

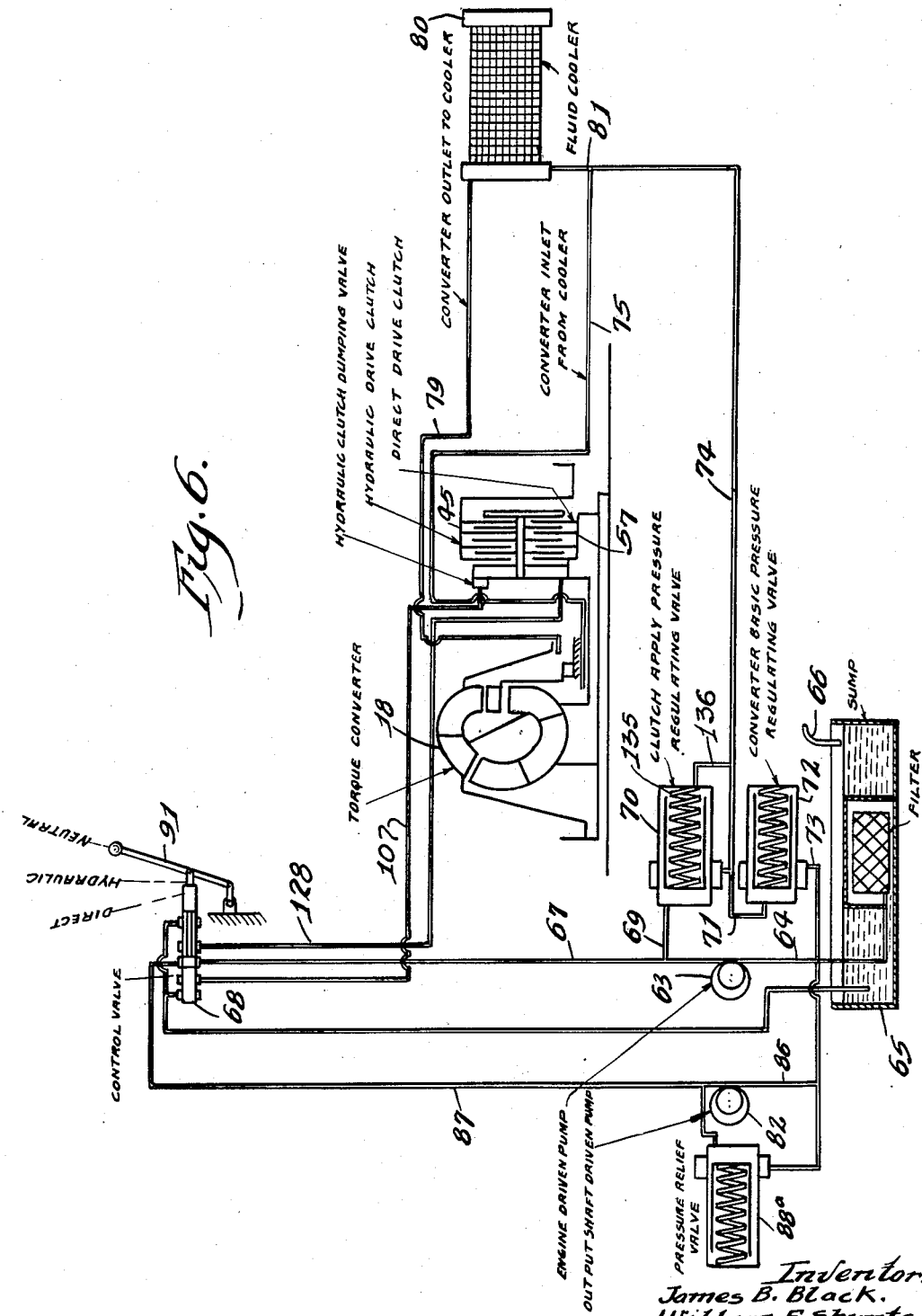

Patented June 16, 1953

2,642,168

UNITED STATES PATENT OFFICE 2,642,168

POWER TRANSMISSION

James B. Black and Wilbur F. Shurts, Rockford, Ill., assignors to Twin Disc Clutch Company, Racine, Wis., a corporation of Wisconsin Application July 20, 1950, Serial No. 175,034

15 Claims. (Cl. 192—3.2)

Our invention relates to power transmissions and more particularly to a unit for conveying power to a sliding gear transmission wherein provision is made for hydraulically transmitting power to the load during the starting and accelerating period and for direct transmission when the load reaches a desired speed in conjunction with the ability to effect a full power shift from one drive to the other in either direction.

In units of this type, selectively controlled, hydraulically operated clutches are employed to determine hydraulic or direct drive to the gear transmission and where the latter does not include a synchronizing mechanism, it is desirable to reduce as far as possible the inertia of the parts aft of the clutches when disengaged for the purpose of facilitating gear shifting.

It is therefore the principal object of our invention to provide a transmission of the character indicated which embodies means for applying a substantial braking action on a device between the clutches and gear transmission during the period of clutch disengagement to thereby reduce the flywheel effect of such device.

A further object is to devise a power transmission in which the hydraulic and direct drive clutches are positioned aft of the hydraulic power transmitting part of the unit, such as a hydraulic torque converter, with the parts arranged to provide only a single element, common to both clutches, that tends to exercise a flywheel effect on the gear transmission when the clutches are disengaged and which element is substantially braked to reduce such effect to a minimum.

A further object is to provide a transmission having a hydraulic system including the hydraulic torque converter, a pair of hydraulically operated clutches, a control valve for determining the actuation of the clutches and a pair of pumps for establishing pressure in the converter and working pressure for the clutches, one pump being engine driven and the other pump being driven by the single element with its output blocked under a determined relief when the valve occupies neutral position.

A further object is to provide a transmission which utilizes leakage flow of the working liquid to lubricate and cool the clutch plates.

These and further objects of the invention will be set forth in the following specification, reference being had to the accompanying drawings, and the novel means by which said objects are effectuated will be definitely pointed out in the claims.

In the drawings:

Fig. 1 is a fragmentary, sectional elevation of the transmission as taken along the irregular line 1—1 in Fig. 2, the clutches being shown in disengaged position.

Fig. 2 is an end view looking in the direction of the arrow 2 in Fig. 1.

Fig. 3 is an enlarged sectional elevation of a part of the transmission including the hydraulic drive clutch, the dump valve therefor and the control valve for determining the actuation of both clutches, the valve being shown in neutral position and indicating the relation thereof to certain passages communicating with a pipe leading to the hydraulic drive clutch.

Fig. 4 is a view similar to Fig. 3, omitting the clutch, showing the relation of the valve to certain other passages communicating with another pipe leading to the direct drive clutch.

Fig. 5 is a plan view of the control valve looking in the direction of the arrow 5 in Fig. 3 and showing the opposed relation thereto of the delivery pipes from the engine and output shaft driven pumps.

Fig. 6 is a schematic layout of the hydraulic system, including as one circuit the clutches, the two pumps and control valve, and as another circuit the hydraulic torque converter and connected cooler, the clutches being disengaged.

Referring to Fig. 1, the numeral 10 designates a driving ring that may be secured to an engine flywheel (not shown) or generally any power source and which has toothed, driving connection with a spider ring 11 having a hub 12 which is journaled in the forward end wall 13 of a transmission housing 14 and is splined to one end of an input or driving shaft 15 that always rotates at engine speed and extends within the housing.

Also journaled in the wall 13 and splined to the same end of the shaft 15 adjacent the hub 12 is a hub 16 which carries an impeller 17 forming part of a hydraulic torque converter 18. The outlet and inlet ends of the impeller 17 are operably related, respectively, to connected turbines 19 and 20 constituting first and second stages of the converter, the turbine 20 having a hub 21 which is splined to a sleeve 22 that surrounds and extends for the major part of the length of the shaft 15 and is spaced therefrom to define an elongated, annular chamber 23 for a purpose presently explained. The forward end of the sleeve 22 is journaled in a bearing 24 mounted within the impeller hub 16 and another part of the sleeve is journaled in a bearing 25 mounted in an intermediate housing wall 26.

A reaction member 27 is located between the turbines 19 and 20 and functions in the characteristic manner with respect thereto when power is transmitted through the converter. The hub of the member 27 is keyed to a ring 28 that is journaled on spaced bearings 29 and 29ᵃ carried by a cylindrical extension 30 attached to the central part of the wall 26, the extension being spaced from the sleeve 22 to create an annular passage 31 whose forward end communicates through one or more ports 32 in the turbine hub 21 with the interior of the converter 18 and whose rear end just forwardly of the bearing 25 communicates through a radial passage 33 in the sleeve 22 with the chamber 23, all for a purpose presently explained. Interposed between the ring 28 and extension 30 is a freewheel or overrunning clutch 34 of usual construction which is arranged to hold the reaction member 27 stationary during power transmission through the converter and to permit it to rotate freely with the impeller 17 and turbines 19 and 20 during direct drive.

Substantial losses of working liquid from the ends of the converter 18 are prevented by forward and rear annular cover plates 35 and 36 whose outer peripheries are connected to the turbine 19 and whose inner peripheries fit against piston ring seals 37 and 38 carried by the impeller hub 16 and the wall 26, all respectively. Similar loss at the central portion of the converter is prevented by a piston ring seal 39 interposed radially between the impeller hub 16 and sleeve 22 and axially between the turbine hub 21 and bearing 24.

An annular carrier 40 is splined to the sleeve 22 rearwardly of the wall 26 and its right face, as viewed in Fig. 1, is, recessed to provide outer and inner concentric annular cylinders 41 and 42. The carrier forms the closed ends of the cylinders and extending from the carrier beyond the open ends of and between the cylinders is an externally and internally splined or toothed annulus 43.

An annular piston 44 is slidably mounted in the cylinder 41 in actuating relation to a plurality of clutch plates 45, alternate plates having toothed and sliding engagement with the outer splined surface of the annulus 43 while the intervening plates are similarly engaged with a shell 46 formed integrally with an annular spider 47 having a hub 48 that is keyed to one end of an output shaft 49 which, it will be assumed, is connected to the input shaft of a sliding gear transmission (not shown). The plates 45 are engaged by the piston 44 against an abutment ring 50 whose central portion is secured to the annulus 43. The piston 44, plates 45 and the outer portion of the ring 50 constitute the hydraulic drive clutch of the transmission which, when engaged, establishes drive through the converter 18, sleeve 22, carrier 40, and clutch plates 45 to the spider 47. When the actuating pressure on the piston 44 is removed, release of the clutch plates 45 is effected by a plurality of helical springs 51 that respectively abut a ring 52 mounted on the outer periphery of the piston 44 and an abutment ring 53 mounted on the carrier 40, the ring 52 abutting the carrier when the springs are fully extended. The spider hub 48 is journaled within a bearing 54 interposed therebetween and the rear end wall 55 of the housing 14 through which the shaft 49 extends.

An annular piston 56 is slidable in the cylinder 42 and is operably related to a plurality of clutch plates 57, alternate plates having toothed and sliding engagement with the inner splined surface of the annulus 43 while the intervening plates have similar engagement with a toothed shell 58 formed integrally with a hub 59 splined to the rear end of the driving shaft 15. The hub 59 is journaled within a bearing 60 interposed therebetween and the spider hub 48. The plates 57 are engaged by the piston 56 against the inner portion of the abutment ring 50 and release of these plates is effected by a plurality of helical springs 61 whose opposite ends respectively abut the piston 56 and ring 62 which fits on the sleeve 22 and is suitably held against axial movement. The piston 56, plates 57 and the inner portion of the abutment ring 50 form the direct drive clutch of the transmission.

Selective hydraulic actuation of the hydraulic and direct drive clutches and the maintenance of a working pressure in the converter are accomplished by the following instrumentalities (see Figs. 1, 2 and 6).

An engine driven pump 63 withdraws oil through a pipe 64 from a sump 65 which is preferably remote from the lower part of the housing 14 and is connected to the latter by a pipe 66 whereby oil collected in the housing as presently described drains to the sump. The delivery side of the pump 63 connects by a pipe 67 with one side of a control valve 68 and bridged around the pump 63 is a pair of series related, pressure regulating valves for determining the pressure of the actuating oil for the clutches and the pressure of the oil in the converter circuit.

Specifically, and referring to Fig. 6, a pipe 69 connects the delivery pipe 67 with the inlet of a pressure regulating valve 70 whose outlet connects by a pipe 71 with the inlet of a pressure regulating valve 72 whose outlet connects by a pipe 73 with the pipe 64 and hence with the sump 65. By way of example, the valve 70 is set to open at 100 p. s. i. while the valve 72 is set to open at 50 p. s. i., these valves being conventional in operation. Due to the manner in which these valves are coupled together, the valve 72 back pressures the valve 70 so that a pressure of 150 p. s. i. is available in the delivery pipe 67, but only 50 p. s. i. is present in the pipe 71. Specifically, this result is obtained by making the pressure in the pipe 71 effective against the spring actuated side of the valve 70 so that opening of this valve is against the combined pressures of its spring 135 and the pipe 71 pressure as determined by the valve 72, the latter being made effective, for example, by connecting the right end of the valve 70 (see Fig. 6) by a pipe 136 to a pipe 74 which communicates with the pipe 71.

The pipe 71 communicates by way of the pipe 74 with one end of a pipe 75 constituting the inlet to the converter 18 (see Figs. 1, 2 and 6) and the opposite end of the pipe 75 is mounted in the central portion of the wall 26 and communicates through a passage 76 with the annular passage 31 and thence through the ports 32 with the inner part of the converter circuit. The converter discharges just interiorly of the cover plate 36 and outwardly of the reaction member 27 into a space 77 which in turn connects with a passage 78, also in the central part of the wall 26, and thence with one end of a pipe 79 which serves as the outlet from the converter circuit. It will be understood that the pipes 75 and 79 are spaced from each other transversely of the transmission and that the passages 76 and 78 are similarly related. The pipe 79 feeds oil from the converter 18 to the inlet of a cooler 80 and the outlet of the latter connects by a pipe 81 with the pipe 75. Circulation in the converter cooler circuit is effected by the normal pressure available in the converter 18 and is not due to the pump 63 which through the regulating valves 70 and 72 merely serves to maintain a basic pressure in the converter cooler circuit, assumed in the present instance to be 50 p. s. i.

A second pump 82 is also provided for the transmission and is driven by a shaft 83 (see Fig. 1) which is drivingly connected to a gear 84 whose hub is journaled in the end wall 55 and which meshes with a pinion 85 formed integrally with the hub 48. The pump 82 can therefore be driven from the output shaft 49 whenever both clutches are disengaged and it is necessary to push the tractor to start the engine, the sliding gear transmission being engaged in one of its speeds. Under these conditions, the pump 82 furnishes pressure to engage both clutches as will be presently described.

The suction side of the pump 82 connects by a pipe 86 with the pipe 64 and hence with the sump 65 while the delivery side connects by a pipe 87 with the control valve 68 in generally opposed relation to the connection of the pipe 67 therewith, i. e., the deliveries from the pipes 67 and 87 are masked by the control valve 68 when in neutral position. A pressure regulating valve 88ª is bridged around the pump 82 and is adjusted to a pressure of or above 150 p. s. i. for a reason presently explained.

Referring to Figs. 3, 4 and 5 which show the details of the control valve 68, the latter includes a casing 88 mounted on the housing 14 and having an elongated bore 89. Slidable in the bore 89 is a valve stem 90 whose right end (see Fig. 6) is connected to a pivoted actuating handle 91 whereby the stem may be reciprocated in the bore. For the purpose of holding the stem 90 in any selected position, it includes annular grooves 92, 93 and 94 spaced axially thereof and arranged to selectively engage a spring actuated detent 95 (see Fig. 2), the grooves respectively determining valve stem positions corresponding to neutral, hydraulic and direct drive conditions of the transmission.

The valve stem 90 further includes piston valves 96 and 97 which closely fit the bore 89 and are spaced axially by a reduced neck 98. Annular ports 99 and 100 surround the bore 89 on opposite sides of the piston 97 when the stem 90 occupies the neutral position shown in Fig. 3 and respectively communicate with chambers 101 and 102 in the casing 88 (see Figs. 3 and 4) which are displaced from each other transversely of the casing. Annular ports 103 and 104 also surround the bore 89, the former, when the stem 90 is in the position shown in Fig. 3, being positioned just to the left of the piston valve 96 and the latter to the left of the port 100, the ports 103 and 104 communicating, respectively, through aligned passages in the casing 88 and the top wall of the housing 14 generally designated as exhaust passages 105 and 106. Any oil that flows through the latter passages collects in the bottom of the housing 14 and is returned to the sump 65 through the pipe 66.

The outer end of a pipe 107 extends through the top wall of the housing 14 in communication with the chamber 101 while the inner end is mounted in a ring 108 (see Fig. 1) secured to the central part of the housing wall 26 and in encircling and sealed relation to a hub 109 formed integral with the carrier 40. The inner end of the pipe 107 communicates through a chamber 110 provided in the ring 108 and an annular channel 111 formed in the outer surface of the hub 109 with one or more longitudinal passages 112, also provided in the hub 109, the left end of each passage 112 being closed by a plug 113. The opposite end of the passage or passages 112, as the case may be, connects with the inner end of one or more radial passages 114 provided in the carrier 40. For simplification, only one passage 112 and one passage 114 are illustrated.

Oil flowing through the passage 114 supplies actuating pressure to the hydraulic drive cylinder 41 and control of this flow is exercised by a dump valve 115, there being one such valve for each passage 114. Referring to Fig. 3, the dump valve 115 includes a casing 116 which may be integral with or attached to the carrier 40 adjacent the periphery thereof and offset circumferentially of the carrier so as to clear the passage 114, the lower end of the casing 116 being closed by a wall 117 and its bore 118 being open at its outer end. Closing the outer end of the casing 116 is a cover 119 having a chamber 120 whose ends constantly communicate respectively with the outer end of the passage 114 and the outer end of the bore 118.

Slidable in the bore 118 is a piston valve 121 whose movements outwardly are limited by bosses 122 for abutting the cover 119 and inwardly by a reduced extension 123 for abutting the wall 117. The piston valve 121 is shown in dumping position in Fig. 3 in which it occupies its outermost position and sufficiently uncovers a port 124 providing communication between the cylinder 41 and bore 118 and thence around the extension 123 through a port 125 in the casing 116 connecting the bore 118 with the interior of the housing 14 and hence with the sump 65. A third port 126 in the casing 116 at the inner end thereof provides exhaust for any oil that may leak past the guide shoulder 127 provided on the inner end of the extension 123. When pump pressure is effective in the passage 114, it shifts the piston valve 121 inward, or downward as viewed in Fig. 3, to thereby mask the exhaust port 125 and uncover the port 124 which is thereby placed in communication with the chamber 120 so that pressure is supplied to the hydraulic drive cylinder 41.

The dump valve operates on the principle of pump pressure shifting the piston valve 121 inwardly to thereby engage the hydraulic drive clutch, but when pump pressure to this clutch is interrupted, then at any speed of the engine, the centrifugal force due to the weight of the piston valve 121 is greater than that due to the weight of the column of oil in the passage 114. Under the latter conditions, therefore, the valve shifts outwardly to the quick dumping position shown in Fig. 3 whereupon the springs 51 release the hydraulic drive clutch. Due to the smaller radius of the direct drive clutch, dump valves are not necessary therefor since the release springs 61 effectively counteract the centrifugal action on the relatively small masses of oil en route to the cylinder for this clutch when the pump pressure is interrupted.

The passages through which oil is transferred from the control valve 68 to the direct drive cylinder 42 will now be described. Referring to Figs. 1 and 4, the outer end of a pipe 128 extends through the top wall of the housing 14 in communication with the chamber 102, the pipe 128 being spaced from the pipe 107 transversely of the transmission and the inner end is mounted in the ring 108 in communication with a chamber 129, also included in the ring 108. The chamber 129 connects with an annular channel 130 provided in the outer surface of the carrier hub 109 and this channel in turn connects with one or more longitudinal passages 131 in the hub 109 that communicate with the direct drive cylinder 42.

In describing the operation of the transmission, it will be assumed that the vehicle or tractor is at rest with the engine idling, thus driving the impeller 17 and the pump 63, and that the valve stem 90 is in the neutral position shown in Fig. 3. The piston valve 97 then masks the delivery ends of the pipes 67 and 87 leading from the engine and output shaft driven pumps 63 and 82, respectively, although the latter pump is not then operating. Pump pressure is therefore denied to the outer ends of the pipes 107 and 128 and hence to the hydraulic and direct drive clutch cylinders 41 and 42. At the same time, the pipe 107 connects with the sump 65 through the chamber 101, annular port 99, bore 89, annular port 103, passage 105, the housing 14 and the pipe 66, while the pipe 128 connects with the sump 65 through the chamber 102, annular port 100, bore 89, annular port 104, passage 106, the housing 14 and the pipe 66. Accordingly, the dump piston valve 121 occupies the position shown in Fig. 3 and both clutches are disengaged.

The operator then shifts the sliding gear transmission into first speed and moves the valve stem 90 towards the left until the detent 95 engages the groove 93. The piston valve 96 then masks the annular port 103 and hence the exhaust passage 105 while the piston valve 97 uncovers the delivery ends of the pipes 67 and 87 so that oil under pressure from the pump 63 flows to the annular port 99 and thence through the pipe 107 and the connected passages and through the dump valve 115 to the clutch cylinder 41 to thereby engage the hydraulic drive clutch. At the same time, the piston valve 97 still denies pressure to the chamber 102 so that the direct drive clutch remains disengaged, the latter chamber remaining in communication with the sump 65.

With the hydraulic drive clutch engaged, the engine is connected to the output shaft 49 through the torque converter 18, the reaction member 27 being held from rotating in reverse direction by the overrunning clutch 34 and the vehicle begins moving. When sufficient acceleration of the vehicle has been accomplished to enable the selection of a higher speed ratio in the gear transmission, it is necessary to first disengage the hydraulic drive clutch by returning the valve stem to the position shown in Fig. 3 and thereafter make the gear shift in the usual way.

During this gear change, the inertia of the spider 47, through which the hydraulic drive clutch had been transmitting power to the output shaft 49, exerts a flywheel effect on this shaft that would tend to hamper an easy gear shift. It is an important feature of the invention that means are provided for retarding the rotation of the spider during this period of operation. Since the pump 82 is driven by the spider 47 and further since at the instant of gear shift, the delivery of this pump is blocked by the neutral position of the control valve 68 and all output flow thereof must pass through its regulating valve 88ª, a definite torque drag is imposed on the spider 47 which slows the output shaft 49 sufficiently to facilitate gear shifting. A braking action of any desired degree can be accomplished by adjusting to the required amount the pressure in the relief circuit of the pump 82 so long as this pressure is not below that utilized for engaging the clutches. Whenever the control valve 68 is in positions other than neutral, the pump 82 merely delivers oil to the hydraulic system under the regulation provided by the valves 70 and 72.

The foregoing operation is repeated through all the gear changes in the gear transmission up to and normally including high gear, the control valve 68 being reciprocated between neutral and hydraulic drive positions as above described with all power flow being transmitted through the converter 18. This mode of operation takes advantage of the high starting torque and capacity for rapid, smooth acceleration afforded by the converter 18.

When the vehicle is accelerated to the desired speed, it is desirable to provide direct drive between the engine and the load. This result is accomplished by further shifting the valve stem 90 towards the left until the detent 95 seats in the groove 94. The piston valve 96 then occupies a position further to the left of the annular port 103 but short of the annular port 99 so that the hydraulic drive clutch is unaffected and remains engaged. The piston valve 97 however masks the annular exhaust port 104 and uncovers the port 100 so that pressure oil from the pumps 63 and 82 then flows through the pipe 128 and the connected passages described above to the direct drive cylinder 42 to thereby engage the associated clutch. The drive is then through the shaft 15, both clutches which are in series relation and the spider 47 to the output shaft 49.

Prior to this direct drive connection, the speed of the carrier 40 is less than that of the shaft 15 due to the usual loss through the converter, but when the direct drive clutch is engaged, the speeds of the carrier 40 and shaft 15 are equalized. Since the hydraulic drive clutch remains engaged, the impeller 17 and the turbines 19 and 20 rotate at the same or engine speed. Hence, there will not be any reaction against the blades of the reaction member 27 which, as it is released by the overrunning clutch 34, will begin to rotate with the impeller and turbines. Since power is not then being transmitted through the converter and all parts thereof are rotating at substantially the same speed, the power losses in the converter circuit are negligible. Actually, the reaction member 27 rotates at a slightly slower speed than the impeller and turbines due to the drag of the bearings and the overrunning clutch, but the difference is small.

If the load becomes too heavy to be carried in direct drive, the valve stem 90 is shifted to the hydraulic drive position, i. e., with the detent 95 seating in the groove 93 to thereby deny pressure to the direct drive clutch whose cylinder is connected to the sump by uncovering the port 100 and placing the same in communication with the exhaust port 104 while the hydraulic drive clutch remains engaged. The shift from hydraulic to direct drive and vice versa may be made at any speed ratio in the gear transmission, but when a shift is made in the transmission, both clutches must be disengaged by moving the control valve 68 to neutral position.

A particular advantage of the above construction is that the transmission is characterized by a full power shift, the engine at no time being completely disconnected from the output shaft 49 while the changes from one drive to the other is being effected. As load conditions vary for any given gear situation in the gear transmission, the drive through the transmission 14 may be shifted at will from hydraulic to direct and from direct to hydraulic with the hydraulic drive clutch being always engaged.

A further feature of the invention in addition to the above and the location of the clutches aft of the converter 18 which makes possible a single element connection between the clutches and the output shaft 49, is the provision for lubricating and cooling the clutch plates.

Oil is tapped from the passage 31 and led through the port 33 into the annular chamber 23 and to this quantity is added the leakage past the seal 39 which flows through the bearing 24 and thence to the chamber 23. The oil thus collected flows towards the right, as viewed in Fig. 1, and radially outward past the end of the sleeve 22 to an annular space 132 within the shell 58 which includes a plurality of apertures 133 through which the oil flows to the inner peripheries of the clutch plates 57. Radial passages 134 are also provided in the annulus 43 through which oil thrown outwardly by the plates 57 flows to the clutch plates 45 and oil discharged by the latter collect in the bottom of the housing 14 for return to the sump.

We claim:

1. In a power transmission, the combination of a hydraulic power circuit means including an impeller arranged for connection to a power source and a turbine, a member adapted for connection to an output shaft, first hydraulically actuated clutch means for connecting the turbine to the member, second hydraulically actuated clutch means shiftable between positions providing and interrupting a direct drive between the source and member, the first and second clutch means being located aft of the turbine and the second clutch means when engaged driving through the first clutch means, and a hydraulic pressure system including both clutch means and a control means, the control means being operable to determine the actuation of both clutch means.

2. In a power transmission, the combination of a hydraulic power circuit means including an impeller arranged for connection to a power source and a turbine, a member adapted for connection to an output shaft, a carrier connected to and located aft of the turbine, outer and inner, concentric, friction clutches mounted on the carrier, friction parts of each clutch being drivably connected to the carrier, other friction parts of the outer clutch being drivably connected to the member for providing hydraulic drive and other friction parts of the inner clutch being drivably connected to the power source whereby the inner clutch provides direct drive through the outer clutch when engaged to the member, and means for controlling the operation of both clutches.

3. In a power transmission, the combination of a hydraulic power circuit means including an impeller arranged for connection to a power source and a turbine, a member adapted for connection to an output shaft, a carrier connected to and located aft of the turbine, outer and inner, concentric and hydraulically actuated, friction clutches mounted on the carrier, friction parts of each clutch being drivably connected to the carrier, other friction parts of the outer clutch being drivably connected to the member for providing hydraulic drive and other friction parts of the inner clutch being drivably connected to the power source whereby the inner clutch provides direct drive through the outer clutch when engaged to the member, and a hydraulic pressure system including both clutches and a control valve, the valve being operable to determine the actuation of the outer clutch and selectively the engagement and disengagement of the inner clutch while the outer clutch is engaged.

4. In a power transmission, the combination of a hydraulic power circuit means including an impeller arranged for connection to a power source and a turbine, a disk member adapted for connection to an output shaft, hydraulically actuated clutch means located aft of the turbine and engageable to connect the turbine to the member, and a hydraulic pressure system including the clutch means, a pump drivably connected to the member for establishing working pressure for the clutch means, pressure relief means for the pump, and a control valve for determining the actuation of the clutch means, the control valve in neutral position blocking delivery of the pump whereby rotation of the member is braked at the instant of clutch means disengagement.

5. In a power transmission, the combination of a hydraulic power circuit means including an impeller arranged for connection to a power source and a turbine, a member adapted for connection to an output shaft, a carrier connected to and located aft of the turbine, outer and inner, concentric and hydraulically actuated, friction clutches mounted on the carrier, friction parts of each clutch being drivably connected to the carrier, other friction parts of the outer clutch being drivably connected to the member for providing hydraulic drive and other friction parts of the inner clutch being drivably connected to the power source whereby the inner clutch provides direct drive through the outer clutch when engaged to the member, and a hydraulic pressure system including both clutches, a pump drivably connected to the member for establishing working pressure for both clutches, pressure relief means for the pump, and a control valve, the valve being operable to determine the actuation of the outer clutch and selectively the engagement and disengagement of the inner clutch while the outer clutch is engaged and when in neutral position blocking delivery of the pump whereby rotation of the member is braked at the instant both clutches are disengaged.

6. In a power transmission, the combination of a driving shaft connectible to a power source, a sleeve encircling the driving shaft, hydraulic power circuit means including an impeller connected to one end of the driving shaft and a turbine keyed to an intermediate part of the sleeve, a disk member coaxial with the driving shaft and adapted for connection to an output shaft, a carrier connected to the sleeve and located aft of the turbine, outer and inner, concentric, friction clutches mounted on the carrier, friction parts of each clutch being drivably connected to the carrier, other friction parts of the outer clutch being drivably connected to the member for providing hydraulic drive and other friction parts of the inner clutch being drivably connected to the other end of the driving shaft whereby the inner clutch provides direct drive through the outer clutch when engaged to the member, and means for controlling the operation of both clutches.

7. In a power transmission, the combination of a driving shaft connectible to a power source, a sleeve encircling the driving shaft, hydraulic power circuit means including an impeller connected to one end of the driving shaft and a turbine keyed to an intermediate part of the sleeve, a disk member coaxial with the driving shaft and adapted for connection to an output shaft, a carrier connected to the sleeve and located aft of the turbine, outer and inner, concentric and hydraulically actuated, friction clutches mounted on the carrier, friction parts of each clutch being drivably connected to the carrier, other friction parts of the outer clutch being drivably connected to the member for providing hydraulic drive and other friction parts of the inner clutch being drivably connected to the other end of the driving shaft whereby the inner clutch provides direct drive through the outer clutch when engaged to the member, and a hydraulic pressure system including both clutches, a pump drivably connected to the member for establishing working pressure for both clutches, pressure relief means for the pump, and a control valve, the valve being operable to determine the actuation of the outer clutch and selectively the engagement and disengagement of the inner clutch while the outer clutch is engaged and when in neutral position blocking delivery of the pump whereby rotation of the member is braked at the instant both clutches are disengaged.

8. In a power transmission, the combination of a driving shaft connectible at one end to a power source, a sleeve encircling and spaced from the driving shaft to provide an annular chamber, hydraulic power circuit means including an impeller connected to said one end of the driving shaft and a turbine keyed to an intermediate part of the sleeve, a hub connected to the opposite end of the driving shaft, a disk member coaxial with the driving shaft and adapted for connection to an output shaft, a carrier connected to the sleeve and located aft of the turbine and having an annulus projecting from one side thereof, outer and inner, concentric, friction clutches mounted on the carrier, friction parts of each clutch being drivably connected to the annulus, other friction parts of the outer clutch being drivably connected to the member for providing hydraulic drive and other friction parts of the inner clutch being drivably connected to the hub whereby the inner clutch provides direct drive through the outer clutch when engaged to the member, means for controlling the operation of the clutches, the annulus and hub each including a plurality of radial passages therethrough for respectively providing communication between the plates of the clutches and the chamber, and means for collecting working oil in the chamber for flow through the passages to lubricate and cool the clutch plates.

9. In a power transmission, the combination of a hydraulic power circuit means including an impeller arranged for connection to a power source and a turbine, a disk member adapted for connection to an output shaft, hydraulically actuated clutch means located aft of the turbine and engageable to connect the turbine to the member, and a hydraulic pressure system including the clutch means, first and second pumps respectively connected to the member and to the power source for establishing working pressure for the clutch means, pressure relief means for each pump, and a control valve for determining the actuation of the clutch means, the control valve in neutral position blocking deliveries of the pumps whereby rotation of the member is braked by the first pump at the instant of clutch means disengagement.

10. In a power transmission, the combination of a hydraulic power circuit means including an impeller arranged for connection to a power source and a turbine, a member adapted for connection to an output shaft, first hydraulically actuated clutch means for connecting the turbine to the member, second hydraulically actuated clutch means shiftable between positions providing and interrupting a direct drive between the source and member, the first and second clutch means being located aft of the turbine and being series related for power flow from the second to the first clutch means during direct drive, and a hydraulic pressure system comprising both clutch means and a control valve operable to determine the engagement of the first clutch means, to selectively determine the engagement and disengagement of the second clutch means, and to maintain the engagement of the first clutch means during the engagement of the second clutch means.

11. In a power transmission, the combination of a hydraulic power circuit means including an impeller arranged for connection to a power source and a turbine, a member adapted for connection to an output shaft, first hydraulically actuated clutch means for connecting the turbine to the member, second hydraulically actuated clutch means shiftable between positions providing and interrupting a direct drive between the source and member, the first and second clutch means being located aft of the turbine and being series related for power flow from the second to the first clutch means during direct drive, and a hydraulic pressure system comprising both clutch means, a pump drivably connected to the member for establishing working pressure for both clutch means, pressure relief means for the pump, and a control valve operable to determine the engagement of the first clutch means, to selectively determine the engagement and disengagement of the second clutch means, and to maintain the engagement of the first clutch means during the engagement of the second clutch means, the control valve in neutral position blocking delivery of the pump whereby rotation of the member is braked at the instant both clutch means are disengaged.

12. In a power transmission, the combination of a driving shaft connectible to a power source, a sleeve encircling the driving shaft, hydraulic power circuit means including an impeller connected to one end of the driving shaft and a turbine keyed to an intermediate part of the sleeve, a disk member coaxial with the driving shaft and adapted for connection to an output shaft, a carrier connected to the sleeve and located aft of the turbine, outer and inner, concentric and hydraulically actuated, friction clutches mounted on the carrier, friction parts of each clutch being drivably connected to the carrier, other friction parts of the outer clutch being drivably connected to the member for providing hydraulic drive and other friction parts of the inner clutch being drivably connected to the other end of the driving shaft whereby the inner clutch provides direct drive through the outer clutch when engaged to the member, and a hydraulic pressure system including both clutches and a control valve, the valve being operable to determine the actuation of the outer clutch and selectively the engagement and disengagement of the inner clutch while the outer clutch is engaged.

13. In a power transmission, the combination of a hydraulic power circuit means including an impeller and a turbine, a disk member adapted for connection to an output shaft, hydraulically actuated clutch means engageable to establish a power flow through the circuit means to the member, and a hydraulic pressure system including the clutch means, a pump drivably connected to the member for establishing working pressure for the clutch means, pressure relief means for the pump, and a control valve for determining the actuation of the clutch means, the control valve in neutral position blocking delivery of the pump whereby rotation of the member is braked at the instant of clutch means disengagement.

14. In a power transmission, the combination of a hydraulic power circuit means including an impeller arranged for connection to a power source and a turbine, a disk member adapted for connection to an output shaft, hydraulically actuated clutch means engageable to establish a power flow through the circuit means to the member, and a hydraulic pressure system including the clutch means, first and second pumps respectively connected to the member and to the power source for establishing working pressure for the clutch means, pressure relief means for each pump, and a control valve for determining the actuation of the clutch means, the control valve in neutral position blocking deliveries of the pumps whereby rotation of the member is braked by the first pump at the instant of clutch means disengagement.

15. In a power transmission, the combination of a hydraulic power circuit means including an impeller arranged for connection to a power source and a turbine, a member adapted for connection to an output shaft, a carrier connected to and located aft of the turbine, outer and inner, concentric and hydraulically actuated, friction clutches mounted on the carrier, friction parts of each clutch being drivably connected to the carrier, other friction parts of the outer clutch being drivably connected to the member for providing hydraulic drive and other friction parts of the inner clutch being drivably connected to the power source whereby the inner clutch provides direct drive through the outer clutch when engaged to the member, and a hydraulic pressure system including both clutches, first and second pumps respectively connected to the member and to the power source for establishing working pressure for both clutches, pressure relief means for each pump, and a control valve operable to determine the actuation of the outer clutch and selectively the engagement and disengagement of the inner clutch while the outer clutch is engaged and when in neutral position blocking deliveries of the pumps whereby rotation of the member is braked by the first pump at the instant both clutches are disengaged.

JAMES B. BLACK.
WILBUR F. SHURTS.

References Cited in the file of this patent

UNITED STATES PATENTS

| Number | Name | Date |
|---|---|---|
| 2,226,801 | Black | Dec. 31, 1940 |
| 2,235,418 | Buchhart | Mar. 18, 1941 |
| 2,289,019 | Jessen | July 7, 1942 |
| 2,449,586 | Carnagua | Sept. 21, 1947 |